US006406511B2

(12) United States Patent
Gunner et al.

(10) Patent No.: US 6,406,511 B2
(45) Date of Patent: Jun. 18, 2002

(54) SPRAYABLE ORGANIC FERTILIZER

(75) Inventors: Haim B. Gunner, Amherst; William A. Torello, South Deerfield; Ming-Jung Coler, Anmherst, all of MA (US)

(73) Assignee: EcoOrganics, Inc., Amherst, MA (US)

( * ) Notice: Subject to any disclaimer, the term of this patent is extended or adjusted under 35 U.S.C. 154(b) by 0 days.

(21) Appl. No.: 09/878,563

(22) Filed: Jun. 11, 2001

Related U.S. Application Data

(60) Provisional application No. 60/211,640, filed on Jun. 14, 2000.

(51) Int. Cl.$^7$ .............................................. C05F 11/00

(52) U.S. Cl. ............................. 71/23; 71/64; 71/64.13; 71/904

(58) Field of Search .......................... 71/23, 64, 64.13, 71/904

(56) References Cited

U.S. PATENT DOCUMENTS

| | | | | |
|---|---|---|---|---|
| 3,000,789 A | | 9/1961 | Bertullo et al. | 195/29 |
| 3,942,969 A | * | 3/1976 | Carroll, Jr. et al. | 71/5 |
| 4,006,004 A | | 2/1977 | Seferian et al. | 71/11 |
| 4,216,143 A | | 8/1980 | Ashmead | 260/113 |
| 4,216,144 A | | 8/1980 | Ashmead | 260/115 |
| 4,370,159 A | | 1/1983 | Holtz | 71/5 |
| 4,491,464 A | | 1/1985 | Ashmead et al. | 260/113 |
| 4,617,047 A | * | 10/1986 | Bretzloff | 71/5 |
| 4,818,268 A | | 4/1989 | Holtz | 71/5 |
| 4,997,469 A | | 3/1991 | Moore | 71/11 |
| 5,021,077 A | | 6/1991 | Moore | 71/17 |
| 5,290,749 A | | 3/1994 | Christians et al. | 504/189 |
| 5,725,630 A | | 3/1998 | Roberts et al. | 71/11 |
| 5,840,656 A | | 11/1998 | Kinnersley et al. | 504/115 |
| 5,922,279 A | | 7/1999 | Wang | 426/138 |

FOREIGN PATENT DOCUMENTS

| | | |
|---|---|---|
| GB | 2 185 472 A | 7/1987 |

* cited by examiner

*Primary Examiner*—Chhaya D. Sayala
(74) *Attorney, Agent, or Firm*—Malcolm J. Chisholm, Jr.

(57) ABSTRACT

The invention is a sprayable organic fertilizer for application to a plant or plant soil that includes denatured soybean particles having a total protein content of at least fifty and up to ninety percent by weight, wherein the denatured soybean particles have a particle size of no greater than 250 microns, and wherein the denatured soybean particles are dispersed in an adequate amount of a liquid carrier so that the particles may be evenly sprayed onto the plant or plant soil through a liquid applicator. The denatured soybean particles may be mixed with a yeast extract that stimulates microbial growth. The sprayable organic fertilizer cannot be leached from the soil; cannot burn target plants; enhances the ecosystem of the root zone of the target plants; and, provides a high nitrogen analysis.

13 Claims, 3 Drawing Sheets

US 6,406,511 B2

SPRAYABLE ORGANIC FERTILIZER

CROSS REFERENCE TO RELATED APPLICATION

Figure 1:
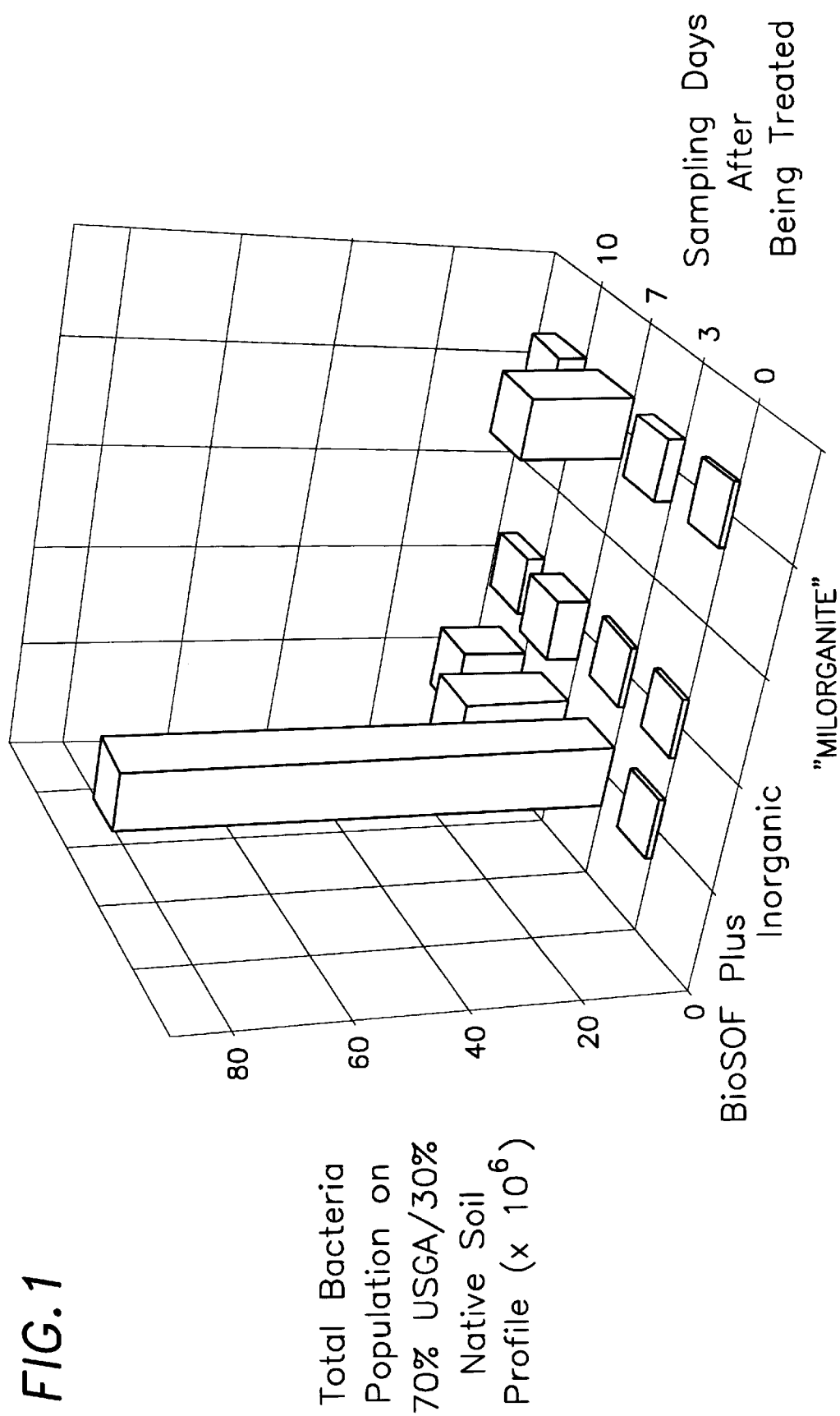

This Application claims the benefit of U.S. Provisional Application Ser. No. 60/211,640 filed on Jun. 14, 2000.

TECHNICAL FIELD

The present invention relates to fertilizers for providing nutrients to plants, and in particular applies to an organic fertilizer that may be sprayed upon plants or plant soils as a liquid suspension.

BACKGROUND OF THE INVENTION

It is well known in application of nutrient fertilizers to commercial crops such as vegetables and turfgrass that provision of macro nutrients nitrogen, phosphorus and potassium, and especially nitrogen is essential to achieving desired growth of the crops. For example, nitrogen fertilizers are typically applied to plant communities or to soils that are to support plant communities as inorganic nitrogen salts or as highly soluble urea. Upon exposure to soil moisture, irrigation or rain water, these salts become available for uptake into the target plants to provide the foundation for metabolism of proteins, etc., as is well known. Occasionally, nitrogen salts or urea granules are first dissolved in water and applied directly to the plants or soils as a solute through a liquid applicator such as a spray machine or an irrigation system.

There are many benefits to application of such highly soluble nitrogen compounds directly to plant communities. The application can be carefully metered to achieve a desired cultural practice, such as promoting a quick flush of growth of a turfgrass after a winter dormancy to encourage dominance of the desired turfgrass over undesired, and still dormant or annual weeds in order to minimize usage of any herbicides to control weed growth. High frequency, low concentration applications can be meticulously applied to achieve optimum growth, and a winter hardening off can be assisted by precise control of fertility in the pre-winter months. Additionally, in highly sensitive greenhouse production, or in drip irrigation in arid orchard crop production, a precise amount of liquid nitrogen solutes may be delivered to target plants without wasting valuable nutrients in fertilizing non-target, adjacent plant communities.

It is increasingly recognized, however, that application of inorganic, highly soluble fertilizers, and especially fertilizers that provide nitrogen, has many deleterious effects, especially on the ecosystem of the plant communities targeted for application of the fertilizers, and for adjacent and even far removed ecosystems. Perhaps the most recognized drawback of soluble inorganic fertilizers is leaching of the nutrients into ground water. Whenever water infiltration through a soil exceeds the combination of evaporation of ground water from the soil and transpiration of ground water through a plant community, the excess water moves or leaches below the plant root zone into subterranean water movement to ultimately flow into nearby streams, aquifers, ponds, lakes, rivers, and ultimately the oceans of the world. Solutes such as nitrate and ammonium freely move with the leachate solution to increase ordinary nitrogen content of the streams, ponds, lakes, etc., which dramatically alters their ecosystems. One well-known effect frequently referred to as eutrophication is to enhance plant growth in the streams, ponds and lakes so that the ordinary dissolved oxygen content of the water is diminished, thereby decreasing available oxygen for fish that may eat the plants so that formerly pristine recreational bodies of water become weed infested, unsightly, unpleasant, and unusable problems for communities. Even more troublesome than such increased nitrogen content of streams, ponds or lakes, etc., is a concern for such nitrogen solutes in aquifers and human drinking water such as in deep wells, etc. While careful application of inorganic fertilizers may ameliorate some of this well documented problem, the unpredictability of weather conditions always poses a risk of leaching major proportions of soluble, inorganic fertilizer applications into moving ground water, such as by a sudden downpour of an inch or more of water immediately after application of such fertilizers; a very common problem in fine turfgrass culture, such as on golf courses, parks, athletic fields, etc.

Golf course fine quality turfgrasses pose a special risk of loss of soluble inorganic fertilizers. That is because it is increasingly common to utilize sand having an optimal particle size range as a major or total constituent of the root zone soil to minimize problems related to compaction due to repeated high traffic over limited turfgrass areas. While increasing sand as a constituent of the soil, or using total sand soils of specific particle size ranges, helps turfgrasses withstand high traffic, such sand soils are especially susceptible to leaching of soluble nutrients into ground water that moves the nitrogen solutes away from the target turfgrass plants and into aquifers, streams, etc.

Many efforts have been undertaken to develop slow release nitrogen fertilizers through complicated encapsulation and/or granulation methods that rely upon compounds such as urea. While some such expensive fertilizers have received limited acceptance, the vast majority of nitrogen fertilizers world-wide still include highly soluble, inorganic nitrogen salts or urea that produce nitrate or ammonium ions that freely leach from soils of target plant communities, and that are wasteful as fertilizer and disruptive of the larger ecosystem.

Additional efforts have focused upon using organic fertilizers from plant and animal sources that provide nitrogen in a slowly released form to avoid leaching of the fertilizer into ground water. To date, however, organic fertilizers have met with only limited acceptance due to substantial difficulties. One such difficulty is a low amount of nitrogen that is only slowly available. An example of an organic fertilizer that has had some success is sold under the trademark "MILORGANITE", that is made by the Milwaukee Metropolitan Sewerage District company, of Milwaukee, Wis., U.S.A. "MILORGANITE" has a macro nutrient, or nitrogen, phosphorous, potassium, weight percent analysis of 6.75% nitrogen, 2.65% phosphorus, and 0.46% potassium and approximately 83% of the nitrogen is water insoluble. "MILORGANITE" organic fertilizer is frequently used in professional turfgrass culture and non-food horticulture such as perennial and annual flower production. However, it is virtually never the sole fertilizer for managers of such crops, and typically must be utilized with traditional highly soluble inorganic salt or urea types of nitrogen fertilizers. More traditional organic fertilizers, such as raw or processed animal waste products have problems related to low and slowly available nitrogen release rates, and also have severe use limitations based upon unacceptable odors, and application restrictions to live plant communities, such as turfgrass plantings in athletic fields, home lawns, cemeteries, parks, golf courses, etc. and have some limited utility in tilled soils prior to seeding.

Accordingly, there is a need for an organic fertilizer that will provide a substantial amount of nitrogen to target plant communities at a rate commensurate with plant nutritional needs and desired cultural practices, that will enhance the ecosystem of the soil within which the plant is growing, and that will not be leached from the soil.

SUMMARY OF THE INVENTION

The invention is a sprayable organic fertilizer for application to a plant or plant soil that includes denatured soybean particles having a total protein content of at least fifty (50) percent by weight, wherein the denatured soybean particles have a particle size of no greater than 250 microns, and wherein the denatured soybean particles are dispersed in an adequate amount of a liquid carrier so that the particles may be evenly sprayed onto the plant or plant soil through a liquid applicator. In a preferred embodiment, the denatured soybean particles are mixed with a yeast extract that stimulates microbial growth. The yeast extract may be between 0.1 percent and 1.0 percent by weight of the sprayable organic fertilizer. In an additional preferred embodiment, the denatured soybean particles have a total protein content of at least ninety (90) percent by weight, and the liquid carrier in which the particles are dispersed is an agitated liquid.

By the phrase "denatured soy bean particles", it is meant that a soy bean meal is first treated to have vegetable oil extracted, and the remaining soy bean meal is then treated to have water soluble compounds removed leaving a denatured soy bean, which is then ground to produce denatured soy bean particles having a particle size of no greater than 250 microns.

It is stressed that it is well known in efforts to produce fertilizer compounds that soy bean derived products are commonly used. However, until the development by the inventors herein of the sprayable organic fertilizer described above using a form of denatured soy bean particles, it was only known to use "hydrolyzed", "solublized", or "activated" soy bean proteins as a direct fertilizer source. It was generally considered that denatured soy bean particles, or denatured soy bean isolates were not soluble in polar solvents such as water. For example, in U.S. Pat. No. 4,370,159 that issued on Jan. 25, 1983 to Holtz, a conglomerate particle is disclosed that utilizes denatured soy protein as a "matrix" (see Col. 3, lines 52–68) to support enhancer droplets within folds of the denatured protein matrix, wherein the enhancer droplets are held within the folds of the matrix by formyl bridges, and the enhancer droplets include activated soy protein with activator materials, water and vegetable oils to make the activated material an available nutrient. Other U.S. Patents and agricultural documents consistently recite that denatured soy bean particles (frequently referred to as "soy protein isolates") are too insoluble for application as a fertilizer source of nitrogen directly to plants or plant soils. (For example, see U.S. Pat. No. 4,818,268, that issued on Apr. 4, 1989 also to Holtz, at Col. 5, lines 37–46.)

The inventors of the present sprayable organic fertilizer including denatured soy particles came upon the realization of the value of denatured soy protein particles through usage of such particles as components of a microbial growth medium for laboratory growth and study of various microorganisms. Recognizing the success of the denatured soy particles in laboratory growth of the microorganisms, the inventors concluded field growth of microorganisms may also be substantially assisted by application of the same denatured soy particles to plant communities. After considerable research of resulting increases in microbial growth in field studies, the inventors have concluded that the enhanced microflora have also effectively broken down the denatured soy protein particles into plant available nutrients, so that an unexpected direct fertility effect has been achieved. In particular, the embodiment of the sprayable organic fertilizer that includes a total protein content of at least 50 percent provides at least 8.5 percent nitrogen by weight, and the embodiment that includes a total protein content of at least 90 percent provides at least 14.5 percent nitrogen by weight.

It is the further conclusion of the inventors that their sprayable organic fertilizer is not only insoluble and hence immune from leaching out of the root zone, but that the denatured soy protein particles must first be metabolized by the microflora to produce plant available nitrate and ammonium ions. Therefore the inventors' sprayable organic fertilizer necessarily enhances a healthy, stable ecosystem within the root zone of the target plants. That is because the microflora first reach and maintain a stable growth and decomposition rate, and the nutrients in the denatured soy protein particles become plant available ions for the target plants only after the particles are first ingested as needed and broken down by the microbes to become plant available ions.

It is theorized that prior fertilizer development efforts failed to appreciate the value of denatured soy protein particles because such efforts focused upon a direct effect of potential nutrient formulations upon target plant communities, as opposed to focusing upon an indirect effect that also involves a nutrient effect upon the entire ecosystem of a target plant, and in particular the microflora of a root zone. By enhancing and stabilizing the ecosystem of the root zone, the present sprayable organic fertilizer including denatured soy protein particles not only provides a slow release, non-leaching, high nitrogen source, but also creates a substantially healthier overall ecosystem in which the target plant grows, thereby diminishing a survival capacity of invasive pathogens that could attack the target plants.

Because the denatured soy protein particles are not soluble, they cannot be suddenly leached away due to excess water. Moreover, they cannot "burn" target plants in the event of an over application of the sprayable organic fertilizer because the insoluble denatured soy protein particles cannot effect a high-solubility induced reverse-osmosis killing of target plants, which is a common and well known problem associated with soluble inorganic fertilizers.

The characterization of the denatured soy particles as having a particle size "no greater than 250 microns" refers to a diameter of the particles, and is intended to be a maximum size that will support even distribution of the particles as suspended in a liquid carrier, such as water. It is stressed that the water carrier does not render the denatured soy bean protein particles soluble, but instead is necessary for an even spray or distribution by a liquid applicator of the particles onto a target plant community or plant soil. By stating the "denatured soybean particles are dispersed in an adequate amount of a liquid carrier so that the particles may be evenly sprayed" or distributed onto the plant or plant soil, it is meant that the dispersion into the liquid carrier is sufficiently dilute that the resulting spray or distribution onto the plant or plant soil effects a uniform growth of the target plant, or plant community, as opposed to a spotty, "polka-dotish", or inconsistent growth of the plants.

The liquid applicator may be a standard pressurized tank with one or more spray nozzle outlets, or an irrigation system that injects fertilizer ("fertigation") into pipes to be dispensed with irrigation water through standard irrigation heads. Because of the particle size of the denatured soy particles, it may be necessary to utilize an agitator, such as a rotating arm within a tank, especially for a static fertigation tank, unlike a tractor pulled or hand carried pressure tank, to maintain an even dispersion of the particles in the liquid carrier, and to avoid clogging of spray nozzles of the liquid applicator.

Accordingly, it is a general object of the present invention to provide a sprayable organic fertilizer that overcomes deficiencies of prior art fertilizers.

It is a more specific object to provide a sprayable organic fertilizer that enhances an ecosystem of the target plant community or plant soil to which the fertilizer is applied while supplying a high rate of nitrogen.

It is yet another object to provide a sprayable organic fertilizer that becomes available as a nutrient for a target plant based upon nutrient needs of the ecosystem of the plant community.

It is a further object to provide a sprayable organic fertilizer that cannot be leached from plant soils and that cannot burn target plants.

These and other objects and advantages of this invention will become more readily apparent when the following description is read in conjunction with the accompanying drawings.

BRIEF DESCRIPTION OF THE DRAWINGS

FIG. 1 is a grid chart showing an enhanced soil bacterial population after application of an embodiment of a sprayable organic fertilizer of the present invention to a first soil profile.

FIG. 2 is a grid chart showing an enhanced soil bacterial population after application of an embodiment of a sprayable organic fertilizer of the present invention to a second soil profile.

FIG. 3 is a grid chart showing an enhanced soil bacterial population after application of an embodiment of a sprayable organic fertilizer of the present invention to a third soil profile.

DETAILED DESCRIPTION OF THE PREFERRED EMBODIMENTS

The inventors have developed four preferred embodiments or formulations of their sprayable organic fertilizer, and for convenience have characterized each formulation by an identifying brand name or trademark. In order to readily distinguish between the four embodiments, the four identifiers will be described and utilized herein. The first formulation is a sprayable organic fertilizer that includes denatured soybean particles having a total protein content of at least 50 percent by weight, wherein the denatured soybean particles have a particle size that is no greater than 250 microns in diameter, and wherein the denatured soybean particles are dispersed in an adequate amount of liquid so that the particles may be evenly sprayed onto the plant or plant soil through a liquid applicator, such as a pressurized tank and nozzle, or an irrigation system. Because this and all of the four embodiments described herein act as biological stimulants, the prefix "Bio" has been added to the first letters of the three words "sprayable organic fertilizer" (e.g., "SOF") to produce the identifying brand name "BioSOF" for the above described first embodiment. The denatured soy particles having the above described characteristics may be acquired from any source of soy beans processed to satisfy the above characteristics. One exemplary source is commercially available denatured soybean particles sold under the trademark "NUTRISOY 7B" and sold by the Archer Daniels Midland Company of Decatur, Ill., U.S.A. The BioSOF formulation has an effective nitrogen analysis of 8.5 percent.

A second formulation is the same as the first in terms of the characteristics of the denatured soybean particles, however the denatured soybean particles have a total protein content of at least 90 percent by weight. As stated above, such denatured soybean particles may be acquired from any source, and an exemplary source is commercially available denatured soybean particles sold under the trademarks "ARDEX F and F Dispersible", and "PRO FAM 646, 648, 781 and 982" by the aforesaid Archer Daniels Midland Company. Because of the increased total protein content, this formulation has the identifying brand name "BioSOF Plus", and has an effective nitrogen analysis of 14.5 percent.

A third formulation is the same as the first formulation, except that a yeast extract is added to the denatured soy particles in order to enhance organic matter decomposition for accelerated nutrient availability of the nitrogen and other nutrients in the soy protein particles. The yeast extract may be any yeast extracts and autolysates well known in the art and currently used for fermentation, food and laboratory media as a selective growth stimulant to soil microflora populations. A preferred amount of yeast extract and autolysates mixed with the denatured soy particles (not including the liquid carrier) is between about 0.1 percent to about 1.0 percent of the dry weight of the combined denatured soy particles and yeast extract and autolysates. An exemplary commercially available yeast extract is sold under the trademark "HY-YEST 455" brand yeast extracts and autolysates by the Quest International company of Hoffman Estates, Ill., U.S.A. The brand name identifier for this third formulation utilized by the inventors and for convenience is "BioMAG Plus".

A fourth formulation is the same as the third, in terms of the characteristics of the denatured soybean particles, however the denatured soybean particles have a total protein content of at least 90 percent by weight. The same sources for the aforesaid 90 percent protein by weight denatured soybean particles and the aforesaid yeast extract and autolysates may be used for this formulation. The brand name identifier for this formulation is "BioMax". It is pointed out that for the third and fourth formulations, the about 0.1 percent to about 1.0 percent of yeast extract and autolysates may be added and mixed with the denatured soybean particles as a dry mixture prior to dispersing the denatured soybean particles and yeast extract in the carrier liquid, or the about 0.1 percent to about 1.0 percent of yeast extract and autolysates may be added to a liquid carrier before or after mixing in of the denatured soybean particles.

As shown in FIGS. 1, 2 and 3, the second or "BioSOF Plus" formulation was applied to three separate soil profiles and compared to a traditional inorganic fertilizer (described in FIGS. 1–3 as "Inorganic") having approximately the same 14.5 percent nitrogen analysis by weight, and also to the above described, commercially available organic fertilizer sold under the trademark "MILORGANITE". In the comparative tests, each treated soil was tested using a standard dilution plate count methodology. Total bacterial populations were measured prior to treatment ("0 Sampling Days After Treatment"), and at 3, 7 and 10 days after treatment for the applications of the inventors' "BioSOF Plus" fertilizer formulation, the "Inorganic" fertilizer, and the "MILORGANITE" trademark brand organic fertilizer. In the test summarized in the FIG. 1 grid chart, as indicated on the left axis, the particular soil tested was a "70% USGA/30% Native Soil Profile", meaning that 70% of the mineral fraction of the soil was a sand having a particle size range and distribution recommended by the "United States Golf Association", and 30% was a native silt loam soil. In the test summarized in FIG. 2, the soil tested was a 100 percent "USGA Sand Profile", meaning again that the entire mineral fraction of the soil was a sand having a particle size range and distribution recommended by the "United States Golf Association". In the test summarized in FIG. 3, the soil tested was 100 percent "Native Soil", meaning a silt loam soil texture.

Figure 2:
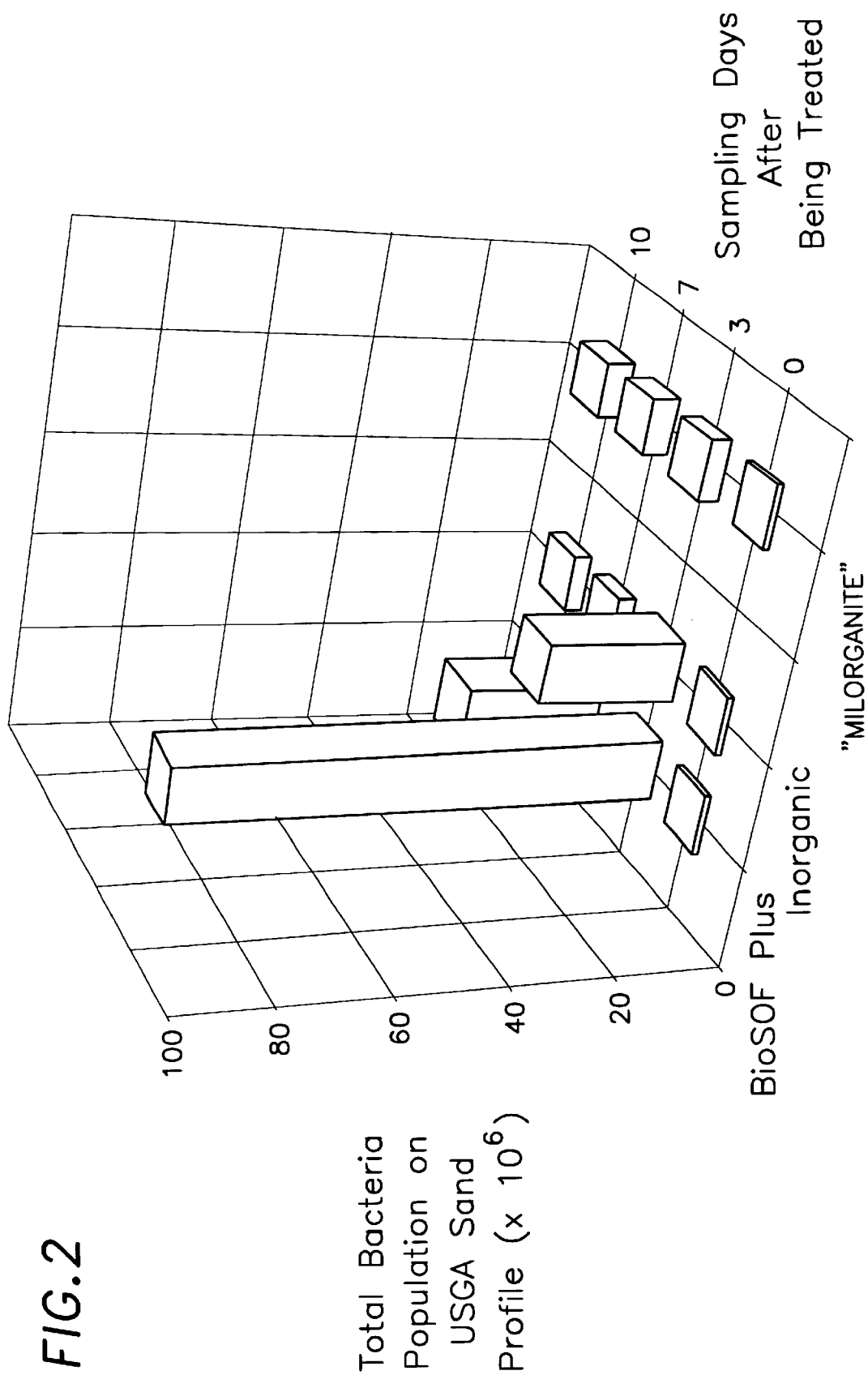
Figure 3:
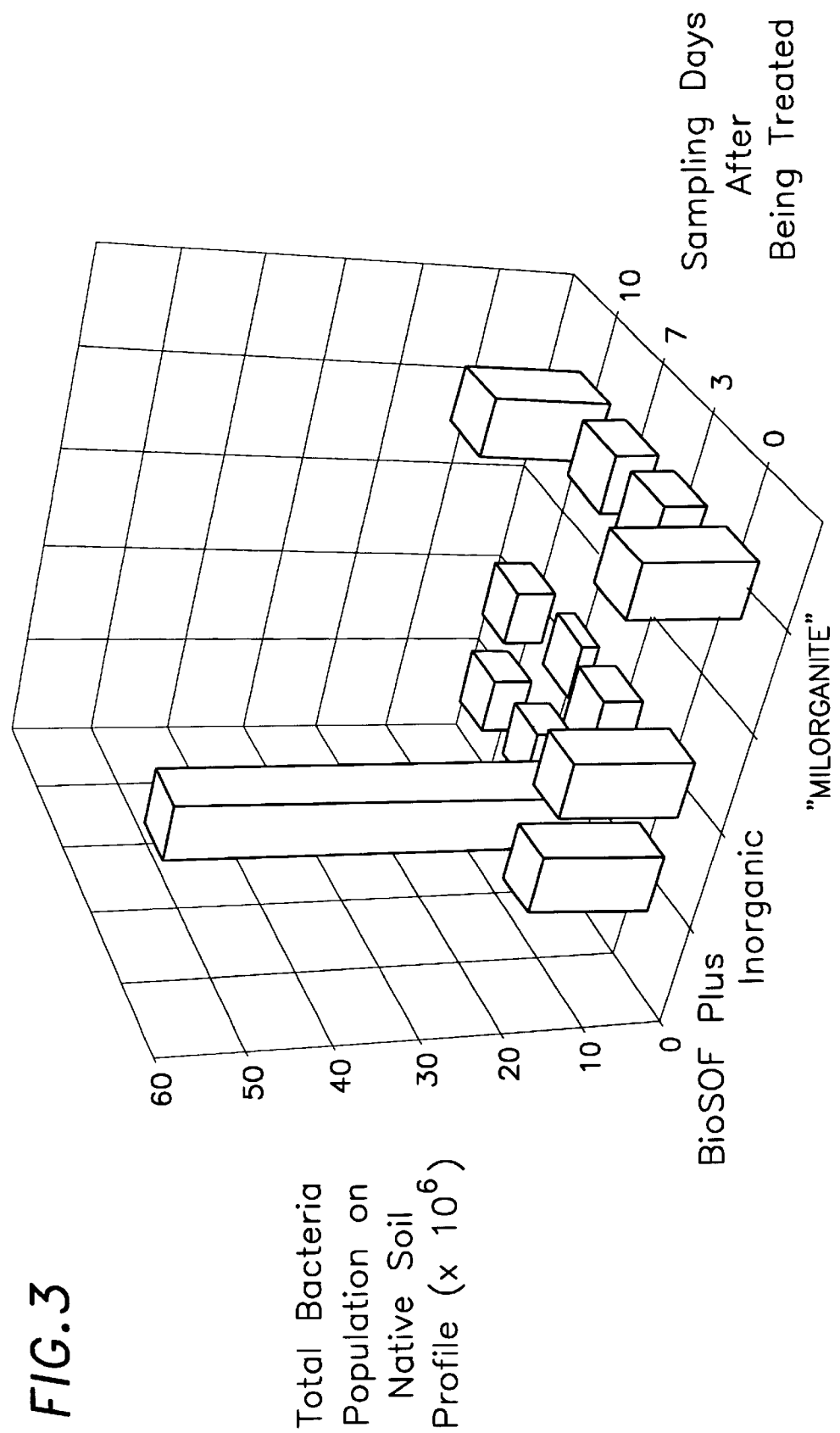

As is dramatically demonstrated in the FIGS. 1–3 grid charts, in all three soils the inventors' "BioSOF Plus" brand formulation of their sprayable organic fertilizer achieved vastly superior results in the first sampling test at three days after treatment. These tests clearly support the inventors'explanation of the unexpected effectiveness of their sprayable organic fertilizer including denatured soybean particles being linked to a substantial enhancement of the microbial activity in the root zone of the target plants, and hence to a substantial enhancement of the ecosystem of the target plants.

Additional testing of the above described three soil profiles was undertaken to measure the quality of turfgrasses grown on the three soil profiles subject to fertility treatment by the inventors'"BioSOF Plus" brand fertilizer, and an inorganic fertilizer, both of which were applied to the turfgrass at the same rate of nitrogen per 1,000 square foot, and both of which were compared to an untreated control plot. Table 1 describes "Turf Quality Assessment" of turfgrass grown on the "70% USGA/30% Native Soil Profile" for four sampling periods over a growing season. Table 2 describes "Turf Quality Assessment" of the turfgrass for the same four sampling periods wherein the turfgrass was grown on a "100 percent "USGA Sand Profile". Table 3 describes "Turf Quality Assessment of a turfgrass grown on a "Native Soil", wherein comparative assessments were measured on Aug. 31, 2000 after about three months of treated growth between an untreated control turfgrass, a turfgrass treated with an inorganic fertilizer and a turfgrass treated by the inventors'"BioSOF Plus" fertilizer, wherein the two turfgrasses were treated at varying rates of application of the two fertilizers of 0.1 pound ("lb.") of nitrogen ("N") per 1,000 square feet ("sq. ft."), 0.2 lb. N. per 1,000 sq. ft., and 0.3 lb. N. per 1,000 sq. ft.

The turf quality measurement numbers appearing in Tables 1–3 are based upon standardized comparative testing protocols developed by the "National Turfgrass Evaluation Program". Information about such testing protocols may be obtained from the National Turfgrass Evaluation Program, at 10300 Baltimore Ave., Bldg. 001, Room 245, Beltsville Agricultural Research Center-West, Beltsville, Md., 20705, U.S.A., and at their internet web site at "www.ntep.org."

TABLE 1

Turf Quality Assessment of "70% USGA/30% Native Soil"

| Reading Date | 06/20/2000 | 07/10/2000 | 08/10/2000 |
| --- | --- | --- | --- |
| Inorganic | 4.67 | 7.50 | 7.33 |
| Untreated Control | 5.00 | 5.17 | 4.33 |
| BioSOF Plus | 4.83 | 7.17 | 7.17 |
| Reading Date | 08/31/2000 | | |
| Inorganic | 7.83 | | |
| Untreated Control | 3.67 | | |
| BioSOF Plus | 7.17 | | |

TABLE 2

Turf Quality Assessment of 100 per cent "USGA Sand"

| Reading Date | 06/20/2000 | 07/10/2000 | 08/10/2000 |
| --- | --- | --- | --- |
| Inorganic | 4.83 | 7.83 | 8.33 |
| Untreated Control | 4.50 | 5.00 | 4.67 |
| BioSOF Plus | 4.67 | 7.17 | 7.50 |
| Reading Date | 08/31/2000 | | |
| Inorganic | 8.17 | | |
| Untreated Control | 4.00 | | |
| BioSOF Plus | 7.50 | | |

TABLE 3

Turf Quality Assessment of "Native Soil" on 08/31/2000

| Application Rates (lb. N per 1,000 sq. ft.) | 0.1 lb. N | 0.2 lb. N | 0.3 lb. N |
| --- | --- | --- | --- |
| Inorganic | 5.83 | 7.17 | 7.67 |
| Untreated Control | 4.67 | 5.17 | 5.00 |
| BioSOF Plus | 6.67 | 7.67 | 7.83 |

It is apparent from these test data that the inventors' "BioSOF Plus" is able to provide equivalent growth nutrients to traditional, soluble inorganic fertilizers. However, unlike the inorganic fertilizer, the present sprayable organic "BioSOF Plus" fertilizer cannot be leached from the soil profile to harm adjacent ecosystems, etc., cannot burn the target plant communities, and dramatically enhances the microflora within the ecosystem of the target plants which will result in enhanced resistance of the ecosystem to invasive pathogens, and increased rates of breakdown of organic matter to thereby provide additional nutrients for the target plants. Consequently one can conclude that the inventors' sprayable organic fertilizer is substantially superior to the tested inorganic fertilizer.

The inventors undertook additional tests of the "BioMAX" formulation of their sprayable organic fertilizer including measurements of both foliar spray and soil applications of the "BioMAX" fertilizer at three rates of application to three different plant communities. The three rates of application were 0.05 lb. N per 1,000 sq. ft.; 0.10 lb. N per 1,000 sq. ft.; and, 0.20 lb. N per 1,000 sq. ft. The three plant communities were ryegrass, bluegrass, and radishes. Four weeks after treatment of the target plant communities, the plants were harvested, and measured dry weights of the plants are recorded in grams in the following Tables 4, 5 and 6. Next to the dry weight recording is a "plus or minus" factor representing the standard deviation for the given weight recordation. In Table 6, application of a soluble inorganic at a recommended rate is also included for comparison to the effectiveness of foliar and soil applications of the inventors'"BioMAX" fertilizer formulation.

TABLE 4

Influence of "BioMAX" Fertilizer on Growth of Ryegrass

| Treatment | Foliar Spray | Soil Application |
| --- | --- | --- |
| Control | 0.175 ± 0.024 | 0.161 ± 0.015 |
| 0.05 lb. N | 0.214 ± 0.050 | 0.271 ± 0.033 |

TABLE 4-continued

Influence of "BioMAX" Fertilizer on Growth of Ryegrass

| Treatment | Foliar Spray | Soil Application |
| --- | --- | --- |
| 0.10 lb. N | 0.248 ± 0.059 | 0.323 ± 0.033 |
| 0.20 lb. N | 0.364 ± 0.091 | 0.468 ± 0.060 |

TABLE 5

Influence of "BioMAX" Fertilizer on the Growth of Bluegrass

| Treatment | Foliar Spray | Soil Application |
| --- | --- | --- |
| Control | 0.070 ± 0.016 | 0.063 ± 0.016 |
| 0.05 lb. N | 0.119 ± 0.019 | 0.175 ± 0.035 |
| 0.10 lb. N | 0.206 ± 0.033 | 0.261 ± 0.053 |
| 0.20 lb. N | 0.274 ± 0.055 | 0.314 ± 0.046 |

TABLE 6

Influence of "BioMAX" Fertilizer on the Growth of Radish

| Treatment | Foliar Spray | Soil Application |
| --- | --- | --- |
| Control | 0.502 ± 0.053 | 0.405 ± 0.081 |
| 0.05 lb. N | 0.469 ± 0.056 | 0.628 ± 0.054 |
| 0.10 lb. N | 0.651 ± 0.055 | 0.754 ± 0.055 |
| 0.20 lb. N | 0.753 ± 0.075 | 0.991 ± 0.040 |
| Inorganic |  | 0.901 ± 0.042 |

As is apparent from these test data, for each plant community and at each application rate, the soil application of the inventors' "BioMAX" sprayable organic fertilizer produced substantially superior growth than the foliar application of the fertilizer. These results support the inventors' explanation that breakdown of the "BioMAX" fertilizer by microflora within the soil ecosystem of the target plant root zone enhances availability of nutrients for the plants as compared to direct foliar application of the unbroken down "BioMAX" fertilizer alone. Comparison of the soil application of the "BioMAX" fertilizer in Table 6 to a recommended application rate of an inorganic fertilizer through a soil application also demonstrates superior performance of the inventors "BioMAX" formulation of their sprayable organic fertilizer. As described above, unlike the soluble inorganic fertilizer, the present sprayable organic fertilizer including denatured soybean particles cannot leach from the root zone, cannot burn the target plants, and will enhance the ecosystem of the root zone of the target plants.

It is to be understood that the present invention also includes a method of fertilizing a plant or plant soil with the inventors' sprayable organic fertilizer. Such a method would include the steps of mixing in a liquid carrier a sprayable organic fertilizer that includes denatured soybean particles having a total protein content of at least fifty percent by weight, and having a particle size of no greater than 250 microns; dispersing the denatured soybean particles in an adequate amount of the liquid carrier so that the particles may be evenly sprayed onto the plant or plant soil through a liquid applicator; and, spraying through the liquid applicator the dispersed sprayable organic fertilizer and liquid carrier onto the plant or plant soil. Additional steps may include mixing with the sprayable organic fertilizer the above described yeast extract, and agitating the liquid carrier and sprayable organic fertilizer prior to spraying the fertilizer.

While the present invention has been described and illustrated with respect to particular embodiments and formulations of the present sprayable organic fertilizer including denatured protein particles, it is to be understood that alternative formulations are within the scope of the invention. For example, the liquid carrier may include additional components that assist application of the sprayable organic fertilizer, such as emulsifiers, surfactants or wetting agents, pesticides, such as insecticides, herbicides, fungicides, etc. Also, while a limit of a particle size of the denatured soybean particles is set at "no greater than 250 microns", it is to be understood that an optimal particle size range that is less than 250 microns may be utilized that is associated with a desired dilution rate for a particular liquid applicator, based upon a nozzle size or pressure factor, or based upon a frequency of application through a growing season or other factors related to efficiency of use of the sprayable organic fertilizer. The preferred ranges utilized by the inventors are those found in the above described soybean particles commercially available from the Archer Daniels Midland Company with respect to the four specific formulations and Archer Daniel Midland products identified in relation thereto. It is to be understood that any alternative source of denatured soybean particles having the above described favorable characteristics are within the scope of the invention. Accordingly, reference should be made primarily to the attached claims rather than to the foregoing description to determine the scope of the invention.

What is claimed is:

1. A sprayable organic fertilizer in a liquid applicator for application to a plant or plant soil, the sprayable organic fertilizer comprising:
   a. denatured soybean particles having a total protein content of at least fifty percent by weight;
   b. wherein the denatured soybean particles have a particle size of no greater than two-hundred and fifty microns; and,
   c. a liquid applicator containing the denatured soybean particles that are dispersed in an adequate amount of a liquid carrier so that the particles may be evenly sprayed onto the plant or plant soil through the liquid applicator.

2. The sprayable organic fertilizer of claim 1, wherein the denatured soybean particles have a total protein content of at least ninety percent by weight.

3. The sprayable organic fertilizer of claim 1, further comprising a yeast extract dispersed in the liquid carrier.

4. The sprayable organic fertilizer of claim 2, further comprising a yeast extract dispersed in the liquid carrier.

5. The sprayable organic fertilizer of claim 1, further comprising a yeast extract and autolysates dispersed in the liquid carrier so that the yeast extract and autolysates are between 0.1 percent and 1.0 percent of a dry weight of a combined weight of the denatured soybean particles and the yeast extract and autolysates.

6. The sprayable organic fertilizer of claim 2, further comprising a yeast extract and autolysates dispersed in the liquid carrier so that the yeast extract and autolysates are between 0.1 percent and 1.0 percent of a dry weight of a combined weight of the denatured soybean particles and the yeast extract and autolysates.

7. The sprayable organic fertilizer of claim 1, wherein the liquid carrier is an agitated liquid carrier.

8. The sprayable organic fertilizer of claim 6, wherein the liquid carrier is an agitated liquid carrier.

9. A method of fertilizing a plant or a plant soil, comprising the steps of:

a. mixing in a liquid carrier a sprayable organic fertilizer that includes denatured soybean particles having a total protein content of at least fifty percent by weight and having a particle size of no greater than two-hundred and fifty microns;

b. dispersing the sprayable organic fertilizer within an adequate amount of the liquid carrier so that the denatured soybean particles may be evenly sprayed onto the plant or the plant soil through a liquid applicator; and, c. spraying through the liquid applicator the dispersed sprayable organic fertilizer and liquid carrier onto the plant or the plant soil.

10. The method of fertilizing of claim 9, comprising the further step of mixing with the liquid carrier a yeast extract.

11. The method of fertilizing of claim 9, comprising the further step of mixing with the liquid carrier a yeast extract and autolysates so that the yeast extract and autolysates are between 0.1 percent and 1.0 percent of a dry weight of a combined weight of the denatured soybean particles and the yeast extract and autolysates.

12. The method of fertilizing of claim 9, comprising the step of mixing with the liquid carrier a sprayable organic fertilizer that includes denatured soybean particles having a total protein content of at least ninety percent by weight and having a particle size of no greater than two-hundred and fifty microns.

13. The method of fertilizing of claim 12, comprising the further step of agitating the dispersed sprayable organic fertilizer within the liquid carrier prior to the step of spraying the dispersed sprayable organic fertilizer through the liquid applicator.

* * * * *